July 25, 1939. W. PITT 2,167,031
CIRCUIT CLOSER FOR USE IN A SIGNALING DEVICE FOR MOTOR VEHICLES
Filed Aug. 20, 1936 2 Sheets-Sheet 1

Inventor:
William Pitt

July 25, 1939. W. PITT 2,167,031
CIRCUIT CLOSER FOR USE IN A SIGNALING DEVICE FOR MOTOR VEHICLES
Filed Aug. 20, 1936 2 Sheets-Sheet 2
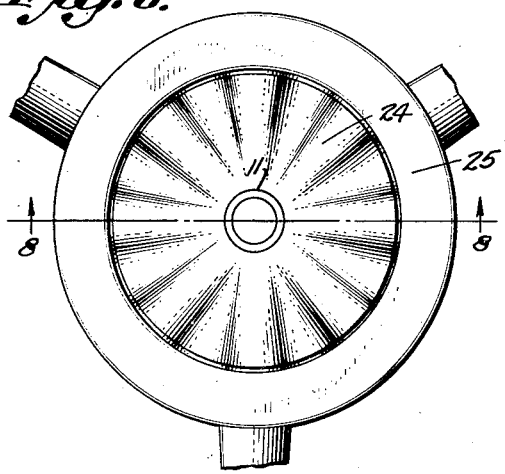
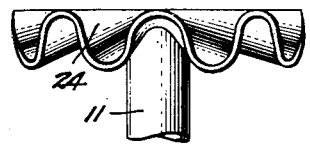
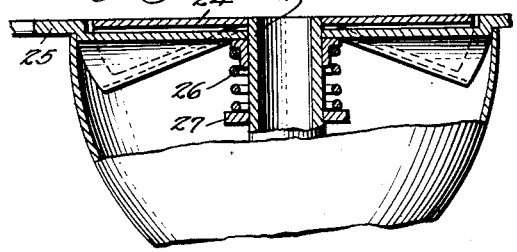
Inventor:
William Pitt Patented July 25, 1939

2,167,031

UNITED STATES PATENT OFFICE 2,167,031

CIRCUIT CLOSER FOR USE IN A SIGNALING DEVICE FOR MOTOR VEHICLES

William Pitt, Brooklyn, N. Y.

Application August 20, 1936, Serial No. 96,981

7 Claims. (Cl. 200—59)

This invention relates to the combination of a steering wheel such as used on motor vehicles, with a circuit closer.

Pursuant to my invention electrically operated signaling devices and/or other auxiliaries of a motor vehicle may be controlled by the operator of said vehicle without removing either of his hands from the steering wheel.

My prevent invention is an improvement on that set forth and described in my Patent #2,042,863 issued June 2, 1936.

In instances of use the above is accomplished by the use of a steering wheel that is mounted in a manner that permits the axis of the steering wheel to be tilted universally in relation to the fixed axis of the steering wheel shaft.

The excursion of tilting is limited to a pre-determined range by the design of the component parts.

Spring pressure maintains the steering wheel and its shaft in alignment when not used as a circuit closer.

A circuit closing device is so disposed that tilting the steering wheel closes the circuits at the will of the operator.

The circuit closing device is mounted on the fixed tubular housing enclosing the steering wheel shaft and is therefore stationary, the universally tilting steering wheel provides for the selective operation of the signaling devices without visual attention, or removal of the vehicle operator's hands from the steering wheel.

The above will be more fully understood from the following detail description and drawings, in which;

Figure 6 is a view from above of another form of universal mounting.

Figure 7 is a drawing of the universal mounting member shown in Figure 6.

Figure 8 is a cross section view of Figure 6, on line 8.

Figure 1:
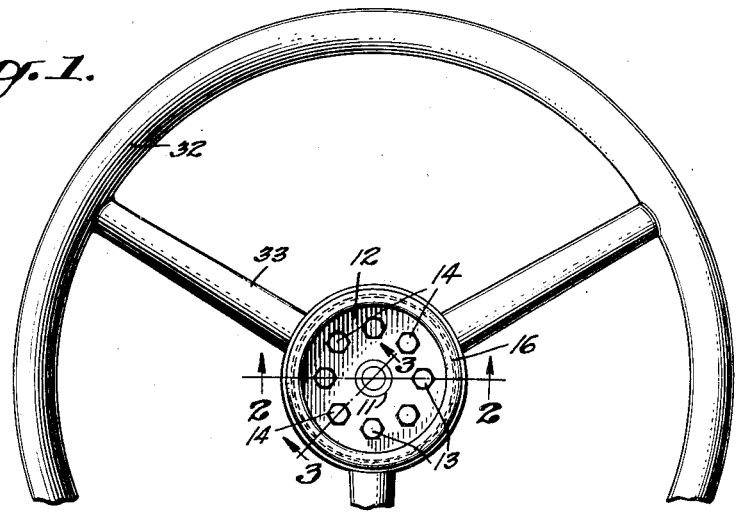
Figure 1 is a view of the steering wheel from above.

Referring to Figures 1, 2, 3, and 4, it is apparent that the steering wheel incorporating my invention resembles the conventional steering wheel in appearance, 11 is the shaft, 12 is a circular disc member fixed to the shaft 11. The disc 12 is suitably drilled to mount the four bolts 13 and the four stud bolts 14. Below the disc 12 the hub section 15 of the steering wheel is held in place by the springs 13a which in turn are held on the bolts 13 by the nuts 13b, the holes in the hub section 15 through which the bolts 13 pass being of such a diameter that they will not bind when the steering wheel is tilted. The stud bolts 14 are tapered on the ends and engage the tapered orifices in the hub section 15, thus eliminating back lash between the disc 12 and the hub section 15 of the steering wheel, the tapered sections of the stud bolts 14 being of sufficient length to maintain engagement with the tapered orifices in the hub section 15 when the steering wheel is tilted.

The rim 32 of the steering wheel is fixed to the hub section 15 by the spokes 33.

The tilting of the steering wheel is limited by the ring section 16, or by adjustment of the nuts 13b on the bolts 13.

The switching mechanism is mounted on the tubular cover 18 which is stationary. The switch 17 is made of the di-electric base 17a in which the contact blades 17b and 17c are mounted, there being four pairs of contact blades, each pair disposed at ninety degrees around the tubular cover 18, one on the right, one on the left, one above and one below.

The cover 19 is a shell of stamped metal or other suitable material and is fastened to the hub section 15 of the steering wheel in a suitable manner and serves as a cover as well as to operate the switches.

Figure 4:
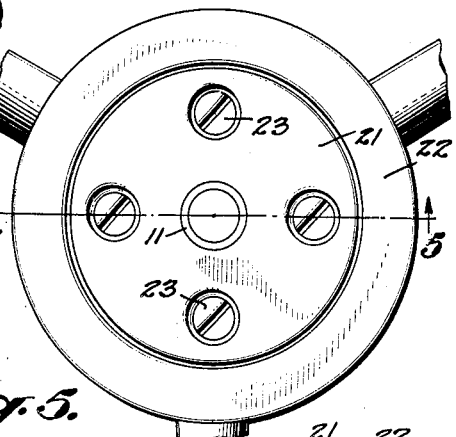
Figure 4 is a view from above the steering wheel of another form of universal mounting.
Figure 5:
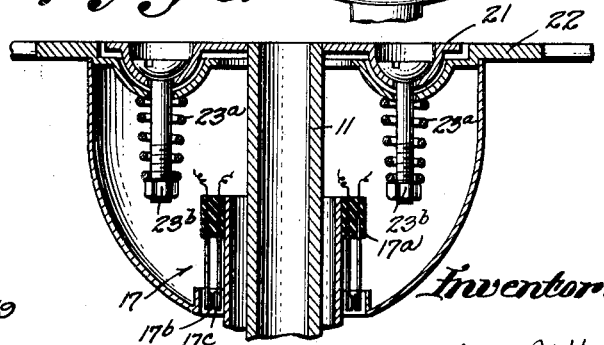
Figure 5 is a cross section view of Fig. 4 on line 5, 5.

In Figs. 4 and 5 the disc section 21 is fixed to the shaft 11 and is provided with four hemispherical projections, said projections engaging four hemispherical depressions formed in the hub section 22 of the steering wheel, the projections and depressions of the above members being perforated for the mounting of the bolts 23 as shown.

The disc member 21 is held in engagement with the hub member 22 by the springs 23a which are held in place on the bolts 23 by the nuts 23b.

The tilting movement of the steering wheel is limited by the adjustment of the nuts 23b on the bolts 23.

Figure 2:
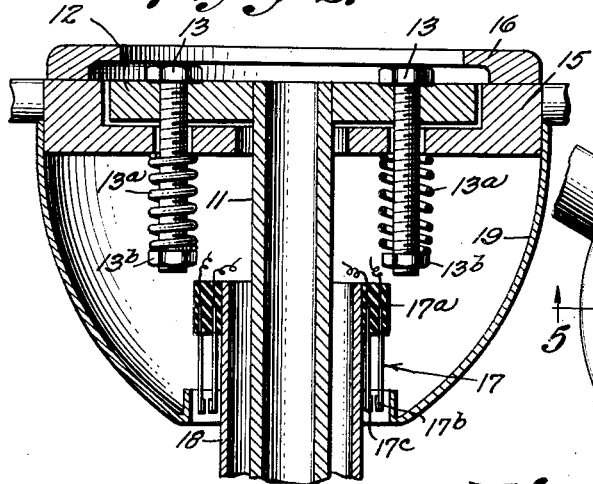
Figure 2 is a cross section view on line 2, 2 Figure 1.
Figure 3:
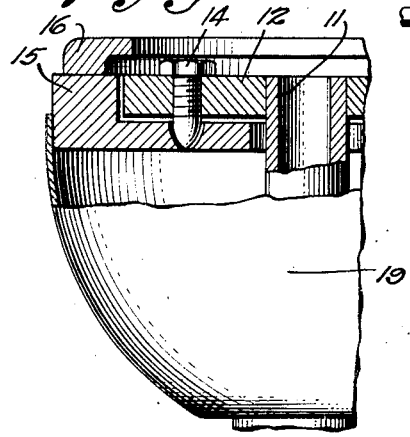
Figure 3 is a cross section view on line 3, 3 Figure 1.

The switching mechanism and cover are the same on Figs. 4 and 5 as described for Figs. 1, 2 and 3.

Figures 6, 7 and 8 the disc member 24 is in the form of a radially corrugated plate fixed to the shaft 11, said disc member 24 meshing with a similarly formed section of the hub member 25, said members 24 and 25 being held in engagement by the spring 26 which is held in place by the collar 27 on the shaft 11.

The tilting movement of the steering wheel is limited by the adjustment of the collar 27.

The switching mechanism is the same on Figs. 6, 7 and 8 as shown on Figs. 1, 2, and 3.

From the above description of the various parts and their location, it will be obvious that the rim 32 of the steering wheel may be depressed at any point causing the axis of the steering wheel to change relative to the axis of the shaft 11, said change being toward point of depression.

Assume that the operator of the vehicle depresses rim of the steering wheel to the right of the shaft 11, causing the steering wheel to tilt to the right, said tilting will cause the lower rim of the cover 19 adjacent to the switch 17 to move the blade 17b into contact with the blade 17c, closing the circuit operating a signaling device indicating the intention of the operator of the vehicle to turn right.

The three other switches are operated in the same manner, the circuit is opened upon cessation of pressure on the rim of the steering wheel by the springs which are compressed when steering wheel is tilted.

In Figs. 1, 2 and 3, the steering torque is transferred between the hub section 15 and the disc member by the stud bolts 14, the bolts 13 serving to hold the springs 13a as well as provide a device for taking the steering torque if the stud bolts 14 should fail.

In Figs. 5 and 6, the steering torque is transferred by the engaging projections and depressions.

In Figs. 6, 7, and 8, the steering torque is transferred by the meshing of the radial corrugations.

Four circuits are shown; more or less could be used.

The steering wheel rim is depressed at a point relative to the shaft 11, regardless of rotation thus providing selection of signals without visual attention on the part of the operator.

The signals suggested are: right-turn, tilt wheel to the right; left-turn, tilt wheel to the left; slow down or stop, tilt wheel to the rear and to operate horn or headlight dimmer, tilt wheel forward.

The stop light now in use is of little value because it operates simultaneously with the brake, with no provision for fore-warning.

The present method of signaling with the hand requires keeping the window open in all kinds of weather and is unsafe after sundown as the hand is not visible and on trucks the width of body is such that the hand will not protrude past the side of the body.

Whereas I have described my invention by reference to specific forms thereof, it will be understood that changes and modifications may be made without departing from the spirit of this invention.

I claim:

1. A combination steering wheel and signaling means for automobiles and the like, comprising, a rotatably mounted shaft, a steering wheel, universal mounting means intermediate said shaft and said steering wheel, said universal mounting means including means to maintain axial alignment of said shaft and said steering wheel, said universal mounting means comprising, a disc fixed to said shaft studs in said disc engaging orifices in a ring section of said steering wheel, bolts fixed to said disc, said bolts passing thru orifices in said ring section, springs mounted on said bolts, and a switch disposed to operate by universal movement of said steering wheel.

2. A combination steering wheel and signaling means for automobiles and the like, comprising, a rotatably mounted shaft, a steering wheel, universal mounting means intermediate said shaft and said steering wheel, said universal mounting means including means to maintain axial alignment of said steering wheel and said shaft, said universal mounting means comprising, a disc fixed to said shaft, studs in said disc engaging orifices in a ring section of said steering wheel, bolts fixed to said disc, said bolts passing thru orifices in sad ring section, springs mounted on said bolts, a switch disposed to operate by universal movement of said steering wheel, an enclosure around said universal mounting means and said switch, said enclosure mounted on said steering wheel and disposed to convey tilting movement of said steering wheel to said switch.

3. A combination steering wheel and signaling means for automobiles and the like, comprising, a rotatably mounted shaft, a steering wheel, universal mounting means intermediate said shaft and said steering wheel, said universal mounting means including means to maintain axial alignment of said shaft and said steering wheel, said universal mounting means comprising, a disc with projections formed thereon, said disc fixed to said shaft, said projections engaging recesses formed in a ring section of said steering wheel, bolts fixed to said disc, said bolts passing thru orifices in said ring section, springs mounted on said bolts, and a switch disposed to operate by tilting of said steering wheel.

4. A combination steering wheel and signaling means for automobiles and the like, comprising, a rotatably mounted shaft, a steering wheel, universal mounting means intermediate said shaft and said steering wheel, said universal mounting means including means to maintain axial alignment of said steering wheel and said shaft, said universal mounting means comprising, a disc with projections formed thereon, said disc fixed to said shaft, said projections engaging recesses in a ring section of said steering wheel, bolts fixed to said disc, said bolts passing thru orifices in said ring section, springs mounted on said bolts, a switch disposed to operate by tilting of said steering wheel, an enclosure around universal mounting means and said switch, said enclosure mounted on steering wheel and disposed to convey tilting movement of steering wheel to said switch.

5. A combination steering wheel and signaling means for automobiles and the like, comprising, a rotatably mounted shaft, a steering wheel, universal mounting means intermediate said shaft and said steering wheel, said universal mounting means including means to maintain axial alignment of said shaft and said steering wheel, said universal mounting means comprising a disc fixed to said shaft, projections on said disc engaging recesses in the hub section of said steering wheel, springs maintaining said projections in engagement with said recesses, and a switch disposed to operate by universal movement of said steering wheel.

6. A combination steering wheel and signaling means for automobiles and the like, comprising a rotatably mounted shaft, a steering wheel, universal mounting means intermediate said shaft and said steering wheel, said universal mounting means including means to maintain axial alignment of said shaft and said steering wheel, said universal mounting means comprising a disc fixed to said shaft, recesses in said disc engaged by projections on the hub section of said steering wheel, springs maintaining said projections in engagement with said recesses, and a switch disposed to be operable by universal movement of said steering wheel.

7. A combination steering wheel and signaling means for automobiles and the like, comprising a rotatably mounted shaft a steering wheel, universal mounting means intermediate said shaft and said steering wheel, said universal mounting means including means to maintain axial alignment of said shaft and said steering wheel, said universal mounting means comprising, a disc fixed to said shaft, projections on said disc engaging recesses in the hub section of said steering wheel, springs maintaining said projections in engagement with said recesses, a switch disposed within an enclosing member, said enclosing member fixed to the hub section of the steering wheel, said switch disposed to be operable by universal movement of said steering wheel.

WILLIAM PITT.